United States Patent [19]

Brewer et al.

[11] Patent Number: 4,991,622
[45] Date of Patent: Feb. 12, 1991

[54] MULTIPLY CONFIGURABLE BACKFLOW PREVENTER

[75] Inventors: John L. Brewer; Gary A. McCauley, both of Clovis, Calif.

[73] Assignee: CMB Industries, Fresno, Calif.

[21] Appl. No.: 454,776

[22] Filed: Dec. 19, 1989

[51] Int. Cl.⁵ .............................................. F16K 17/00
[52] U.S. Cl. .................................. 137/512; 137/271; 285/181
[58] Field of Search ................. 137/512, 614.2, 269, 137/271; 285/168, 181, 184

[56] References Cited

U.S. PATENT DOCUMENTS

| | | | |
|---|---|---|---|
| 1,031,642 | 7/1912 | Haase | 137/271 |
| 2,454,160 | 11/1948 | Greene | 137/271 X |
| 2,581,047 | 1/1952 | Salmond et al. | 285/181 |
| 4,639,016 | 1/1987 | Rogers et al. | 285/181 X |

FOREIGN PATENT DOCUMENTS 2104195 3/1983 United Kingdom ............... 137/512

OTHER PUBLICATIONS

"Backflow Prevention Catalog", Cla-Val Co., P.O. Box 1325, Newport Beach, Ca. 92663. 1978

Primary Examiner—John C. Fox
Attorney, Agent, or Firm—Townsend and Townsend

[57] ABSTRACT

A backflow preventer assembly is provided, which allows for connection of the assembly to the variety of water line configurations. The valve device is attached to at least one rotatable, sealing flange which is rotatable from an in-line configuration to an L-shaped configuration. A rotating sealing flange is provided at each of the inlet opening and outlet opening of the valve device. A stop valve is positioned in each of the rotating flanges.

3 Claims, 3 Drawing Sheets

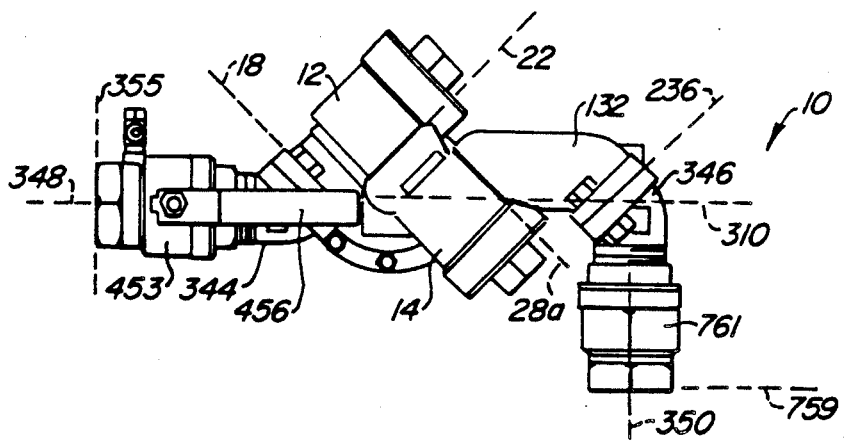
FIG._1A.
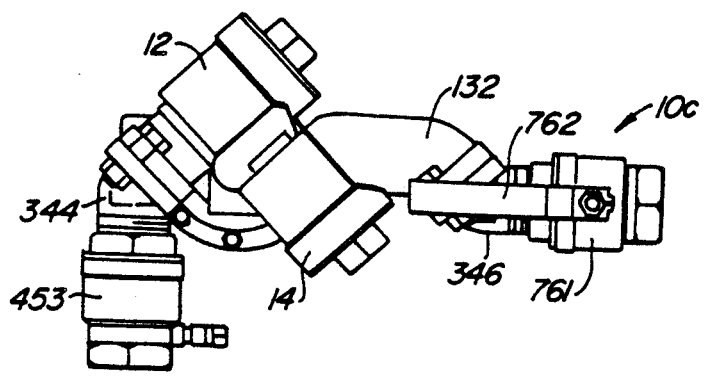
FIG._1B.
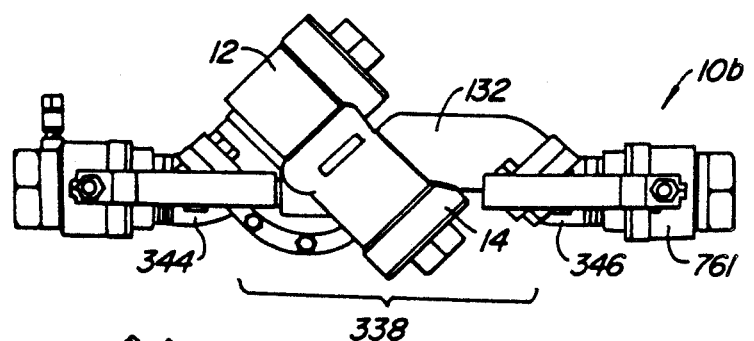
FIG._1C.
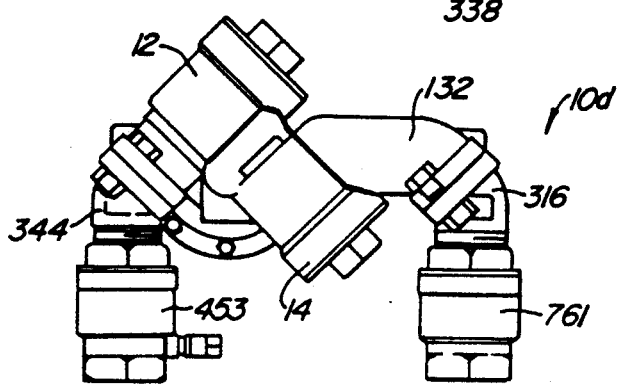
FIG._1D.

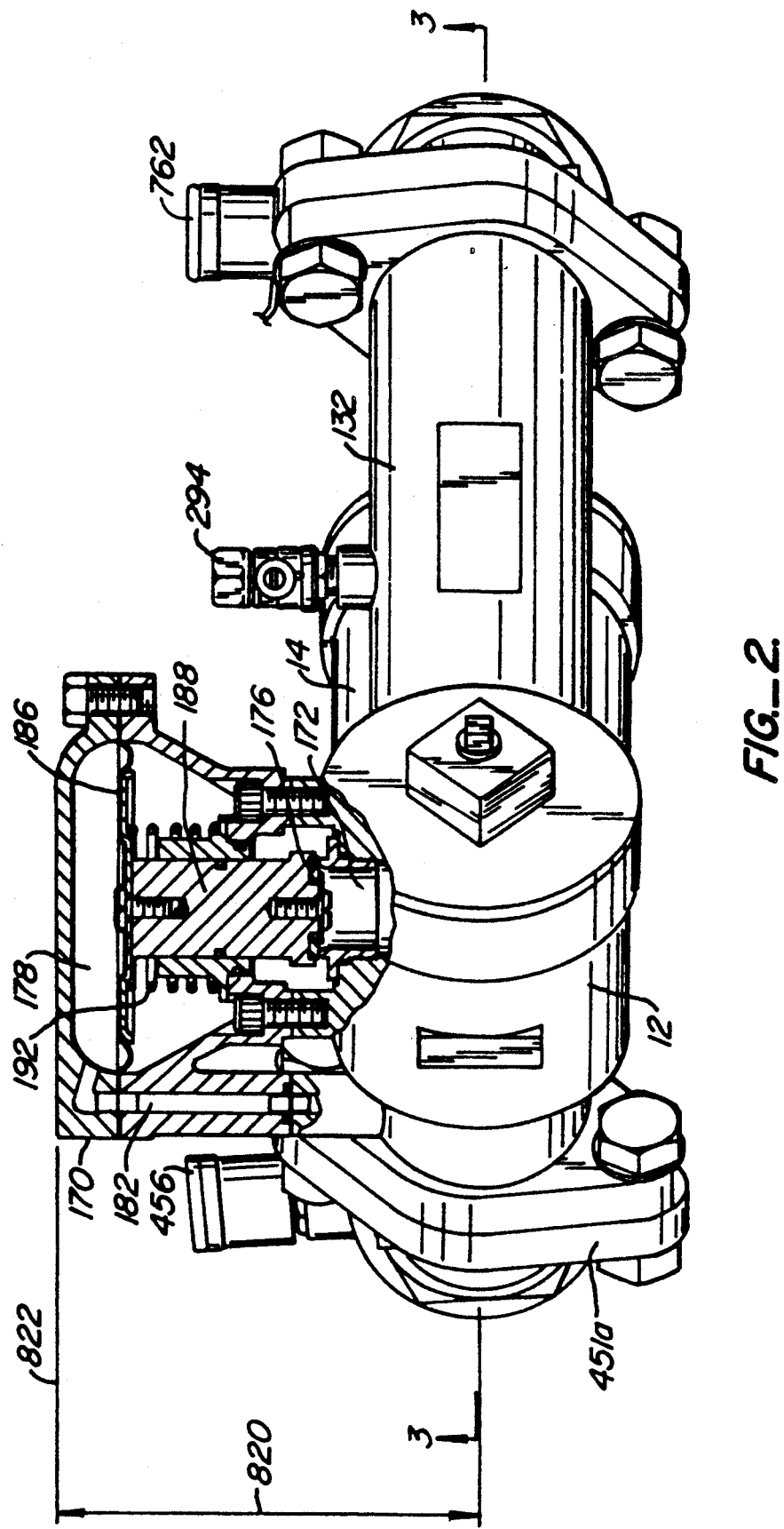
FIG_2.

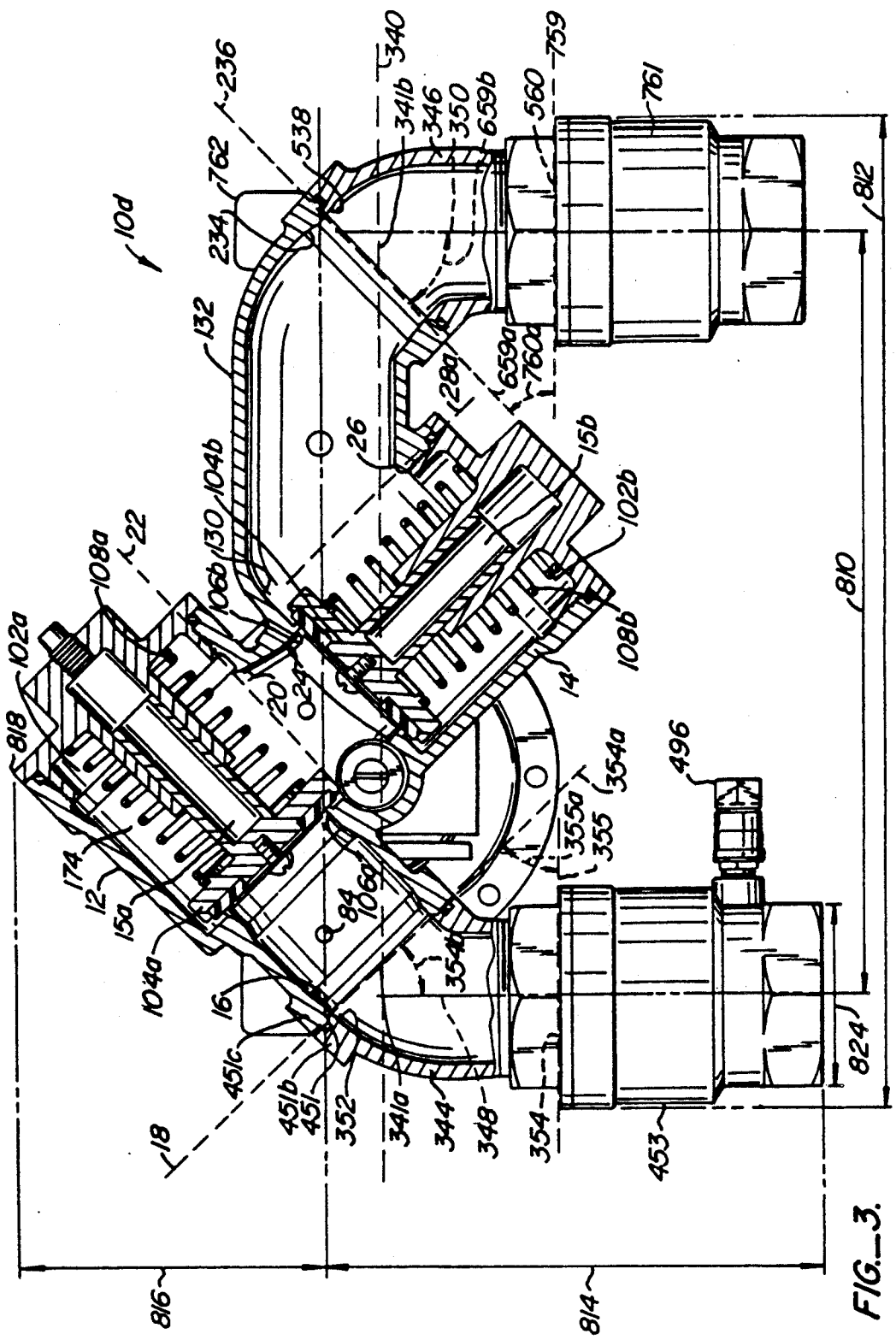
FIG._3.

MULTIPLY CONFIGURABLE BACKFLOW PREVENTER

BACKGROUND OF THE INVENTION

The present invention relates to a backflow preventer which can be placed in a multitude of configurations, and particularly to a backflow preventer with rotatble inlet and outlet fittings.

Check valves are well known for use in assuring that a flow through a conduit occurs only in a predefined direction. Check valves are used, for example, in backflow prevention assembly to prevent backflow of one fluid body into another. Backflow prevention is used in connection with protecting potable water supplies from contaminants which could otherwise be introduced via back siphonage or back pressure. Backflow valves thus are check valves which are designed to accommodate pressures commonly encountered in water supplies, such as about 150 psi or more.

Typically, a check valve is designed to maintain its open configuration as long as there is flow through the valve. Once the flow stops or the line pressure drops below a predetermined value, the check valve closes.

Check valves are typically provided with an inlet opening and an outlet opening, but having only a single predefined configuration of the inlet and outlet openings. Accordingly, when such a backflow preventer is to be installed in a water line, various couplings, fittings, elbows, and the like are used to install the backflow preventer such that the outlet from the water line can be matingly connected to the backflow preventer inlet, and so that the backflow preventer outlet can be matingly connected to the downstream water line. When upstream or downstream stop valves are desired, they are provided as components which must be separately installed. The requirement for such elbows, fittings, valves, and the like creates a number of costs in connection with installation of previous backflow preventers. There is a materials cost in providing such couplings, fittings, etc. There is also a labor cost involved in selecting the appropriate couplings and fittings from the large number which are available, and installing these fittings to mate the backflow preventer with the water line. There is further a maintenance cost, because each coupling which must be added to achieve the desired configuration represents a potential point of leakage.

Typical previous backflow preventers are connected to water lines in an in-line or right-angle position. This connection configuration makes it relatively easy to defeat the backflow preventer using straight line, 90° elbow or spool connectors. Therefore, in previous systems, there was a problem with users removing backflow preventer and replacing them with piping, e.g., to reduce pressure head loss or, during backflow, prevent maintenance or repair, thus endangering the water supply.

SUMMARY OF THE INVENTION

The present invention includes the recognition of the problems of previous backflow preventers, and particularly the requirement for selection, installation, and maintenance of additional couplings, fittings, and the like. According to the present invention, a backflow preventer assembly is provided which has movable components so that the assembly can be placed in a number of configurations to provide for ease of installation or removal from a water line. At least one fitting is provided which is rotatable about its opening from a first in-line configuration to a second perpendicular configuration. Preferably, the backflow preventer assembly includes one such rotatable fitting at the backflow preventer inlet and another at the backflow preventer outlet. In this way, the assembly can be placed in an in-line configuration, first and second L-shaped configurations, and a U-shaped configuration. By providing fittings which lie in a non-standard 45° configuration, undesirable replacement of backflow preventers with non-preventing pipes is made more difficult and is thus discouraged.

BRIEF DESCRIPTION OF THE DRAWINGS

FIG. 1A is a side elevational view of the backflow preventer in a first L-shaped configuration;

FIG. 1B is a side elevational view of the backflow preventer assembly in a second L-shaped configuration;

FIG. 1C is a side elevational view of the backflow preventer assembly in an in-line configuration;

FIG. 1D is a side elevational view of the backflow preventer assembly in a U-shaped configuration;

FIG. 2 is a top plan view of the device of FIG. 1D; and

FIG. 3 is a cross-section taken along line 3—3 of FIG. 2.

DETAILED DESCRIPTION OF THE PREFERRED EMBODIMENT

FIG. 1A depicts the backflow preventer assembly of the present invention in a first L-shaped configuration 10. A first valve housing 12 and a second valve housing 14 are used to house first and second backflow preventer valves 15a, 15b. A number of types of backflow preventer valves are usable as generally known in the art. One example of such a valve is that shown in FIG. 3.

Each of the housings 12, 14 is in the form of a conduit. The first housing 12 has a first opening 16 (FIG. 3) lying in a first plane 18, and a second outlet opening 20 lying in a second plane 22. The second plane 22 is perpendicular to the first plane 18. The second housing 14 has an inlet opening 24 lying parallel to the second plane 22. The second housing 14 has an outlet opening 26 lying in a third plane 28a.

Inside each of the first and second housings 12, 14 is a valve, the valves being configured to operate as a check valve system. As is well known in the art, a number of types of valves can be used for check valve purposes. In the depicted embodiment, the inlet valves 102a, 102b include valve disks 104a, 104b which are urged toward valve seats 106a, 106b by springs 108a, 108b. When flow stops or the line pressure drops below a predetermined value, the check valves 102a, 102b are forced into the closed position depicted in FIG. 3 by the springs 108a, 108b. When the line pressure exceeds a predetermined value, it overcomes the urging of the springs 108a, 108b, and the check valves 102a, 102b open, permitting the flow through the valve opening 16 through the first check valve 102a, out of the exit opening 20 through the entrance opening 24 of the second check valve 102b, through the second check valve and out the exit opening 130 to enter the conduit 132.

As depicted in FIG. 2, a relief valve 170 extends outward from the first valve housing 12. The relief valve 170 is provided in order to discharge possibly contaminated water into the atmosphere, to prevent its entering the water source. The relief valve 170 is optional in the sense that a backflow preventer can be designed which does not include a relief valve 170. When a relief valve is included, a number of configurations can be used, as is well known in the art. In the configuration depicted, an inlet opening 172 is in fluid communication with the interior volume 174 of the first check valve. In the closed configuration of the relief valve depicted, a seating disk, such as a nitrile disk, 176 seats against the edge of the opening 172 by virtue of water pressure in an upper chamber 178. The upper chamber 178 is in fluid communication with the region upstream of the first check valve via a conduit 182, which connects with an opening 184 in the first valve housing 12. A diaphragm 186 forces a spring-loaded piston 188 into the closed position depicted in FIG. 2. When the pressure at the upstream location 182 falls below a predetermined level with respect to the pressure in the valve interior 174, such as a pressure differential of about 3 psi (about 20 kPa), the spring 192 causes the piston 188 to move away from the opening 172 to permit discharge of water to the atmosphere.

A valve conduit 132 (FIG. 1A) leads away from the outlet 26 of the second valve housing 14. The valve conduit 132 has a first opening 130 which lies in the third plane 28a. The valve conduit 132 is preferably fixedly attached to the second housing 14, such as by welding, bolting, clamping, or by integral formation therewith. The valve conduit 132 has a second opening 234 lying in a fourth plane 236. The fourth plane 236 is parallel to the second plane 22 and perpendicular to the first plane 18 and third plane 28a. A first test cock 294 is connected to the conduit 132 in order to provide a position for pressure testing, e.g., by connecting a differential pressure gauge.

The first housing 12, second housing 14, and valve conduit 132 form a valve device 338 whose inlet is the inlet opening 16 of the first valve housing 12, and whose outlet is the outlet 234 of the valve conduit 132. The inlet and outlet openings 16, 234 are preferably circular in shape. The valve device inlet and outlet openings 16, 234 define a first longitudinal axis 340 of the valve device 338 which passes through the centroids 341a, 341b of the valve device openings 16, 234. The plane of the inlet opening 18 and the outlet opening 236 are disposed at an angle, with respect to each other, of about 90°.

Attached to the inlet and outlet openings 16, 234 of the valve device 338 are first and second fittings 344, 346. Each of the fittings 344, 346 has a longitudinal axis 348, 350. The first fitting 344 has first and second openings 352, 354. The first opening 352 of the first fitting 344 lies in a plane 354a which meets the longitudinal axis 348 at an angle 354b of about 45°. The first opening 352 of the first fitting 344 lies in the same plane 18 as the valve device input opening 16. The second opening 354 is in a plane 355 perpendicular to the longitudinal axis 348. The plane of the second opening 355 is thus inclined to the plane of the first opening 18 at an angle 355a of about 45°.

The first fitting 344 is attached to the valve device 338 by a rotatable mating relationship between the inlet opening 16 of the valve device 338 and the first opening 352 of the first fitting 344. An O-ring 451 provides a leakproof seal. The first fitting 344 and valve device 338 are held together in a sealing relationship by a bolt clamp 451a (FIG. 2) which compresses the respective flanges 451b, 451c of the first fitting 344 and valve device 338. This connection provides for rotation of the first fitting 344 with respect to the valve device 338 by loosening or removing the bolt clamp 451a, rotating the fitting 344, and retightening bolt clamp 451a by tightening the bolts passing through the bolt clamp 451a. In this way, a number of different configurations of the first fitting 344 with respect to the valve device 338 are obtained while maintaining the 45° orientation of the axis 348 with respect to the first plane 18, and providing for a fluid seal.

In the preferred embodiment, a stop valve 453 is disposed inside or upstream from the first fitting 344. Although in FIG. 1a-1d, the stop valve 453 is depicted as attached colinearly with and upstream from the first fitting 344, in another embodiment of the present invention, the stop valve 453 is formed as an integral part of the fitting 344. The stop valve can be any of a number of well known valve designs, including a ball valve, a gate valve, or, preferably, a globe valve. Preferably, the stop valve 453 can be manually opened or closed by moving an external handle 456. A second test cock 496 is provided upstream of the stop valve 453 in order to provide a position for pressure testing.

The second fitting 346 has first and second openings 558, 560, with the first opening 558 attached to the outlet opening 234 of the valve device 338. The first opening 558 lies in a plane 659a, which is inclined to the longitudinal axis 350 at an angle 759b of about 45°. The plane 759 of the first opening 558 lies in the plane of the valve device outlet opening 236. The plane 59 of the second opening 355 is perpendicular to the longitudinal axis 350. The plane of the second opening 759 is thus inclined to the plane of the first opening 236 at an angle 760a of about 45°.

The second fitting 346 is rotatably and sealingly attached to the outlet opening 234 of the valve device 338 in a manner similar to the attachment of the first coupling 344 to the valve device 338 depicted in FIG. 3.

The second fitting 346 preferably has disposed therein or downstream therefrom a second stop valve 761 similar to that described above in connection with the first fitting 344, and operable by a handle 762. Although, in the embodiment depicted in FIGS. 1a-1d, the stop valve 761 is depicted as attached colinearly with and upstream from the second fitting 346, in another embodiment the stop valve 761 is formed as an integral part of the fitting 346.

The configuration depicted in FIG. 1A is useful for attachment of the backflow preventer assembly 10 to water lines (not shown) which are disposed at a 90° angle with respect to each other. In order to connect the backflow preventer assembly to a water line which has an inline configuration, the second fitting 346 is rotated about the valve device outlet opening 234 to assume the in-line configuration 10b depicted in FIG. 1C for use in connection with substantially colinear water lines. The in-line configuration can be reconfigured to a second L-shaped configuration 10c, as depicted in FIG. 1B, by rotating the first fitting 344 about the valve device opening 16 to assume the configuration shown in FIG. 1B. The configuration of FIG. 1B can be changed to a U-shaped configuration by rotating the second fitting 346 about the valve device outlet opening 234 to assume the configuration 10d, depicted in FIG. 1D, for use in connection with substantially parallel water lines.

In the depicted embodiment, a first length 810 is defined by the distance between the axes 348, 350 of the first and second fittings 344, 346. A second length 112 represents the overall length of the device, including the stop valves 453, 761. A first height 814 is defined by the distance from the lowermost extent of the stop valves 453, 761 to the uppermost extent of the first and second fittings 344, 346. A second height 816 is defined by the distance from the uppermost point of the first and second fittings 344, 346 to the uppermost extent 818 of the device. A first depth clearance 820 is defined by the distance from the longitudinal axis 340 to the outwardmost extent 822 of the relief valve 170. The value of the various dimensions for the device will be a function of the nominal water-line fitting diameter 824, as can be seen in Table 1.

TABLE 1

| Nominal Water Line Diameter In Inches (cm) | Device Dimensions In Inches (cm) | | | | |
|---|---|---|---|---|---|
| | 1st Length 810 | 2d Length 812 | 1st Height 814 | 2d Height 816 | Lateral Clearance 820 |
| 3/4 (1.90) | 10 (25.40) | 8 1/2 (21.59) | 4 7/8 (12.38) | 4 1/8 (10.48) | 4 1/8 (10.48) |
| 1 (2.54) | 10 1/4 (26.04) | 8 1/2 (21.59) | 5 1/4 (13.34) | 4 1/8 (10.48) | 4 1/8 (10.48) |
| 1 1/2 (3.81) | 18 (45.72) | 11 1/2 (29.21) | 6 7/8 (17.46) | 5 1/4 (13.34) | 5 (12.70) |
| 2 (5.08) | 19 (48.26) | 11 1/2 (29.21) | 7 1/2 (19.05) | 5 1/4 (13.34) | 5 (12.70) |

A number of variations and modifications of the invention can be used. Backflow preventer valves other than those described can be used, provided they are effective for use as backflow preventers, i.e., provide a check valve function at pressures encountered in potable water supplies. A single backflow preventer valve or three or more backflow preventer valves can be provided in the valve device 338. The valves can be provided in configurations other than the T-shaped configuration shown, and the valve conduit may not be needed in some of those configurations, as long as the angles of the valve device inlet and outlet openings cooperate with the angles of the rotatable fittings, to produce in-line and L-shaped configurations upon rotation of the fittings.

Although the invention has been described by way of a preferred embodiment and various modifications, other variations and modifications can be used, as will be apparent to those skilled in the art, the invention being described in the following claims.

What is claimed is:

1. A backflow preventer assembly, comprising:
backflow preventer valve means;
a housing for said valve means having a fluid inlet first end and a fluid outlet second end, a first opening formed at one of said first and second ends and a second opening formed at the other of said first and second ends, said first and second openings of said housing lying substantially in first and second planes, said first and second planes being disposed with respect to each other at an angle of about 90°;
a first fitting having a first longitudinal axis and having first and second openings, said first opening of said first fitting lying in a plane which is inclined with respect to said longitudinal axis at an angle of about 45°;
means for sealingly, rotatably joining said first opening of said first fitting to said first opening of said housing to permit rotation of said first fitting with respect to said first opening of said housing;
a second fitting having a second longitudinal axis and having first and second openings, said first opening of said second fitting lying in a plane which is inclined with respect to said second longitudinal axis at an angle of about 45°; and
means for sealingly, rotatably joining said first opening of said second fitting to said second opening of said housing to permit rotation of said second fitting with respect to said second opening of said housing.

2. A backflow preventer assembly, comprising:
backflow preventer valve means;
conduit means containing said valve means, said conduit means having first and second openings, said openings defining a first axis passing substantially through the centroids of said first and second openings;
a first fitting rotatably, sealingly mounted to said first opening, and having a second axis, said first and second axes defining a first plane, rotation of said first fitting causing movement of said first plane;
a second fitting rotatably, sealingly mounted to said second opening, and having a third axis said first and third axes defining a second plane, rotation of said second fitting causing movement of said second plane;
said conduit, first fitting and second fitting forming an assembly which is reconfigurable, as a result of rotation of said first and second fittings, among
a linear configuration wherein said first, second and third axes are substantially parallel;
a first L-shaped configuration in which said first and second axes are substantially parallel and said third axis is substantially perpendicular to said first and second axes;
a second L-shaped configuration in which said second and third axes are substantially parallel and said first axis is substantially perpendicular to said second and third axes; and
a U-shaped configuration in which each of said second and third axes are substantially perpendicular to said first axis.

3. A backflow preventer assembly, comprising:
a first valve means;
a housing for said first valve means, defining a fluid inlet lying in a first plane and a fluid outlet lying in a second plane, said second plane perpendicular to said first plane;
a second valve means;
a housing for said second valve means, defining a fluid inlet lying in said second plane and a fluid outlet lying in a third plane, said third plane parallel to said first plane;
a valve conduit having a first opening lying in said third plane and a second opening lying in a fourth plane, said fourth plane parallel to said second plane;
a first fitting having a first longitudinal axis and having third and fourth openings, said third opening lying in said first plane, said fourth opening lying in a fifth plane, said fifth plane inclined to said first plane at an angle of about 45°, said first fitting sealingly, rotatably joined to said first valve inlet to permit rotation of said first fitting with respect to said first valve inlet; and a second fitting having a second longitudinal axis and having fifth and sixth openings, said fifth opening lying is said fourth plane, said sixth opening lying in a sixth plane, said sixth plane inclined to said fourth plane at an angle of about 45°, said second fitting sealingly, rotatably joined to said second valve inlet to permit rotation of said second fitting with respect to said second valve outlet;

said first and second valves configured to permit flow from said third opening in a direction towards said sixth opening, and to close to prevent flow in a direction from said sixth opening towards said third opening;

a first stop valve disposed in said first fitting with external means for manually opening and closing said first stop valve; and a second stop valve disposed in said second fitting with external means for manually opening and closing said second stop valve.

* * * * *